United States Patent
Seo et al.

(10) Patent No.: US 11,750,056 B2
(45) Date of Patent: Sep. 5, 2023

(54) BUSBAR UNIT FOR MOTOR

(71) Applicant: HYUNDAI MOBIS CO., LTD., Seoul (KR)

(72) Inventors: Yeong Woo Seo, Yongin-si (KR); Seong Jun Hwang, Yongin-si (KR); Ui Il Jeong, Yongin-si (KR); Yul Kyu Son, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 52 days.

(21) Appl. No.: 17/473,109

(22) Filed: Sep. 13, 2021

(65) Prior Publication Data
US 2022/0094233 A1 Mar. 24, 2022

(30) Foreign Application Priority Data
Sep. 23, 2020 (KR) .......................... 10-2020-0123238

(51) Int. Cl.
| | |
|---|---|
| *H02K 3/50* | (2006.01) |
| *H02K 3/52* | (2006.01) |
| *H02K 5/22* | (2006.01) |
| *H02K 3/38* | (2006.01) |

(52) U.S. Cl.
CPC .................. *H02K 3/50* (2013.01); *H02K 3/38* (2013.01); *H02K 3/52* (2013.01); *H02K 5/225* (2013.01); *H02K 2203/09* (2013.01)

(58) Field of Classification Search
CPC .. H02K 3/50; H02K 3/38; H02K 5/22; H02K 5/225; H02K 3/52; H02K 3/522; H02K 1/146; H02K 3/28; H02K 3/521; H02K 3/00

USPC .......................................................... 310/71
See application file for complete search history.

(56) References Cited

U.S. PATENT DOCUMENTS

| | | | | |
|---|---|---|---|---|
| 2003/0090166 A1* | 5/2003 | Kobayashi | ............. | H02K 3/522 310/144 |
| 2012/0286593 A1* | 11/2012 | Yokogawa | ............. | H02K 1/278 310/43 |
| 2018/0233985 A1* | 8/2018 | Haga | ........................ | H02K 3/50 |

FOREIGN PATENT DOCUMENTS

WO WO-2019082708 A1 * 5/2019 ............... H02K 3/38

OTHER PUBLICATIONS

Okita et al, Stator and Motor, May 2, 2019, WO 2019082708 (English Machine Translation) (Year: 2019).*

* cited by examiner

*Primary Examiner* — Alexander A Singh
(74) *Attorney, Agent, or Firm* — NSIP Law (57) ABSTRACT

A busbar unit electrically connected to a motor comprising a stator around which a coil is wound includes: a first terminal including a first body and a first terminal part protruding from an upper portion of the first body and electrically connected to the coil; a first holder configured to support the first terminal such that the first terminal part is exposed to an outside of the busbar unit; and a second holder disposed on an upper portion of the first holder and configured to press the coil against the first terminal part.

17 Claims, 11 Drawing Sheets

BUSBAR UNIT FOR MOTOR

CROSS-REFERENCE TO RELATED APPLICATIONS

This application claims the benefit under 35 U.S.C. § 119(a) of Korean Patent Application No. 10-2020-0123238 filed on Sep. 23, 2020 in the Korean Intellectual Property Office, the entire disclosure of which is incorporated herein by reference for all purposes.

TECHNICAL FIELD

The present disclosure relates to a busbar unit for a motor, and more particularly, to a busbar unit for a motor, which may have a simple structure and improve stability and reliability.

BACKGROUND ART

A hybrid vehicle or an electric vehicle, which is called an environmentally-friendly vehicle, generates driving power using an electric motor (hereinafter, referred to as a 'drive motor') that obtains rotational force from electrical energy.

In general, the drive motor includes a stator coupled to a housing, and a rotor rotatably disposed in the stator with a predetermined air gap from the stator.

The stator includes stator cores provided by stacking electrical steel sheets, and stator coils wound around the stator cores.

A busbar is disposed at an upper side of the stator, and the stator coils are connected to an external power source through the busbar.

The busbar is structured to include a plurality of terminals inside a ring-shaped holder, and the terminals are configured as a combination of three phase terminals connected to U-phase, V-phase, and W-phase power sources, and a neutral terminal that connects the phase terminals.

The stator coils are fused with terminal portions of the terminals by being welded to the terminal portions of the terminals (e.g., welded by applying electric current) one by one in a state in which the stator coils are compressed. After the terminal portions of the terminals are fused with the stator coils, an insulating material (e.g., epoxy) for insulation between the terminals is applied to cover the terminal portions of the terminals.

In the related art, however, both a compressing force and heat are applied to the stator coil during a process of fusing the stator coil with the terminal portion of the terminal, which causes a deterioration in strength and durability of the stator coil.

Further, when the motor vibrates or external impact is applied to the motor, the fused portion of the stator coil, whose strength becomes low, is easily damaged or separated from the terminal portion of the terminal.

Meanwhile, the busbar is disposed at the upper side of the stator in an axial direction of the stator, and an overall height of the motor (a height of the motor in the axial direction of the stator) is also increased as a thickness of the busbar (a thickness of the busbar in the axial direction of the stator) is increased. As a result, the thickness of the busbar needs to be minimized in order to miniaturize the motor.

However, because the four terminals (the U-phase terminal, the V-phase terminal, the W-phase terminal, and the neutral terminal), which constitute the busbar, are stacked in a vertical direction in the related art, there is a limitation in decreasing an overall height (a vertical thickness) of the busbar. Further, because a space (a height) for disposing the busbar needs to be ensured at the upper side of the stator even though the thickness of the busbar is decreased, there is a problem in that it is difficult to decrease the overall height of the motor.

Moreover, in the related art, an overmolded layer for electrical insulation needs to be individually formed on each of the four terminals (the overmolded layer needs to be formed to surround each of the terminals), and an overmolded housing needs to be additionally provided to surround the entire circumference of the plurality of overmolded layers stacked in the vertical direction. As a result, there is a problem in that the manufacturing process (including a total of five injection molding processes) is complicated and cumbersome.

In addition, in order to ensure a creeping distance for the electrical insulation between the respective terminals, a predetermined thickness or more of the overmolded layer needs to be ensured. However, since an overall height of the busbar is increased as a thickness of the overmolded layer is increased, there is a problem in that it is difficult to ensure a sufficient thickness of the overmolded layer.

Therefore, recently, various studies have been conducted to simplify the structure of the busbar and improve durability, stability, and reliability of the coil, but the study results are still insufficient. Accordingly, there is a need to develop a technology to simplify the structure of the busbar and improve durability, stability, and reliability of the coil.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a busbar unit electrically connected to a motor including a stator around which a coil is wound includes: a first terminal including a first body and a first terminal part protruding from an upper portion of the first body and electrically connected to the coil; a first holder configured to support the first terminal such that the first terminal part is exposed to an outside of the busbar unit; and a second holder disposed on an upper portion of the first holder and configured to press the coil against the first terminal part.

The busbar unit may further include: a pressing protrusion configured to press the coil, and disposed on a lower surface of the second holder facing an upper surface of the first holder.

The first terminal part may further include: a terminal body protruding from the upper portion of the first body; a first terminal protrusion protruding from an upper portion of the terminal body; and a second terminal protrusion protruding from the upper portion of the terminal body and spaced apart from the first terminal protrusion. The first terminal protrusion and the second terminal protrusion may cooperatively define a terminal groove configured to accommodate the coil.

The first holder may surround the first body, and the first terminal part may be exposed from the upper portion of the first holder.

The first terminal may include a plurality of first terminals spaced apart from one another in a radial direction of the stator.

The busbar unit may further include a second terminal including: a second body disposed on the upper portion of the first holder; and a second terminal part protruding from a lower portion of the second body and electrically connected to the coil. The second holder may support the second terminal such that the second terminal part is exposed to the outside of the busbar unit.

The second terminal part may be configured to press the coil with a force applied by the second holder.

The busbar unit may further include a coil accommodation part configured to accommodate the coil, and disposed on an upper surface of the first holder facing a lower surface of the second holder.

The coil accommodation part may include: a first accommodation protrusion protruding from the upper portion of the first holder; and a second accommodation protrusion protruding from the upper portion of the first holder and spaced apart from the first accommodation protrusion. The first accommodation protrusion and the second accommodation protrusion may cooperatively define an accommodation groove configured to accommodate the coil.

The second holder may surround the second body. The second terminal part may be exposed from a lower portion of the second holder.

The busbar unit may further include a fastening member configured to fasten the first holder and the second holder. The second holder may be configured to press the coil with a fastening force applied by the fastening member.

The busbar unit may further include: a first fastening hole disposed in the first holder; and a second fastening hole disposed in the second holder. The fastening member may be fastened to the first fastening hole and the second fastening hole.

The busbar unit may further include: a guide groove disposed in an outer circumferential surface of the first holder; and a guide protrusion protruding from a lower portion of the second holder and accommodated in the guide groove.

The busbar unit may further include: a guide groove disposed in an inner circumferential surface of the first holder; and a guide protrusion protruding from a lower portion of the second holder and accommodated in the guide groove.

The guide protrusion may include a coil guide groove configured to accommodate the coil.

Other features and aspects will be apparent from the following detailed description, the drawings, and the claims.

DETAILED DESCRIPTION

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 11, a busbar unit 10 for a motor according to an embodiment of the present disclosure includes: first terminals 100 electrically connected to a motor including a stator 20 around which coils 60 are wound, the first terminals 100 each including a first body 110 and first terminal parts 120 protruding from an upper portion of the first body 110 and electrically connected to the coils; a first holder 200 configured to support the first terminals 100 so that the first terminal parts 120 are exposed to the outside; and a second holder 400 disposed on an upper portion of the first holder 200 and configured to press the coil against the first terminal parts 120.

For reference, the busbar unit 10 for a motor according to the embodiment of the present disclosure may be mounted in various types of motors in accordance with required conditions and design specifications, and the present disclosure is not restricted or limited by the types and structures of the motors.

As an example, a motor, to which the busbar unit 10 according to the embodiment of the present disclosure is applied, may be used as a drive motor for an environmentally-friendly vehicle, such as a hybrid vehicle and/or an electric vehicle, which obtains driving power from electrical energy.

Figure 1:
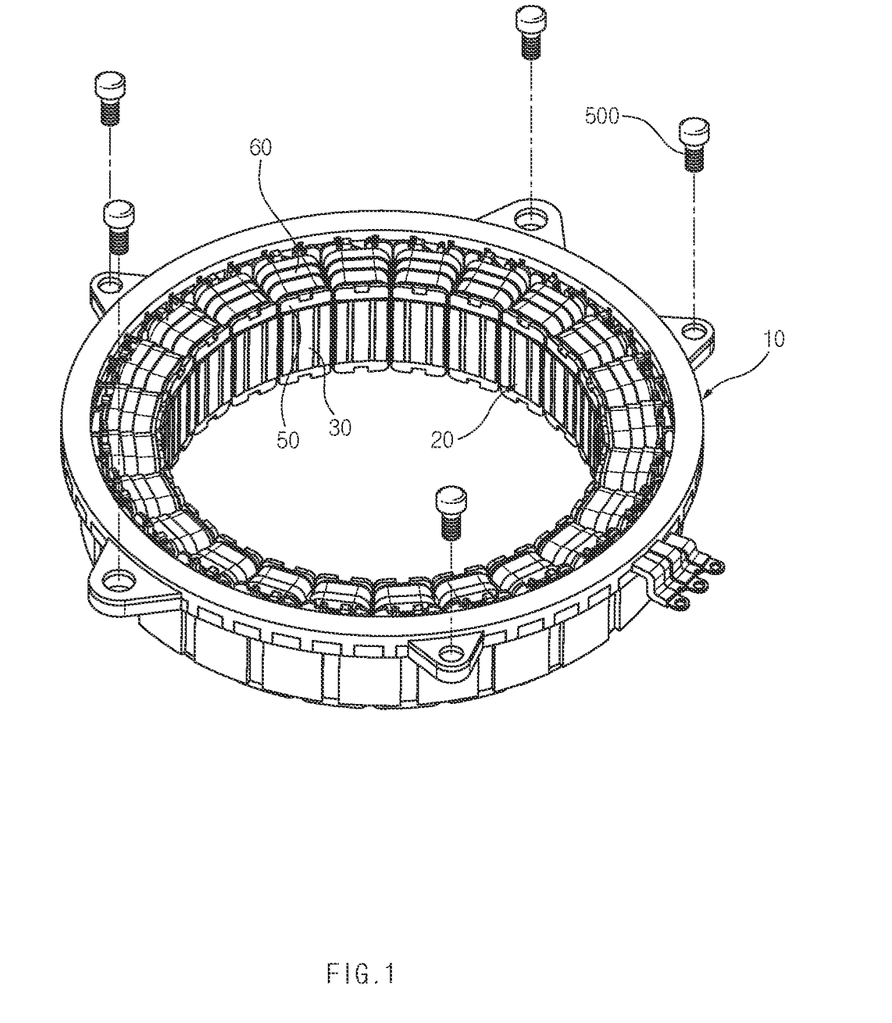
FIG. 1 is a view for explaining an example in which a busbar unit for a motor according to an embodiment of the present disclosure is mounted.

For example, the drive motor is an inner-rotor-type synchronous motor and includes the stator 20 installed in a motor housing (not illustrated), and a rotor (not illustrated) rotatably installed in the stator 20 with a predetermined air gap from the stator 20. The busbar unit 10 according to the embodiment of the present disclosure may be connected to the stator 20.

The stator 20 may be accommodated in the housing (not illustrated), and the coils 60 may be wound around the stator 20 so as to induce an electrical interaction between the stator and the rotor.

For example, the stator 20 includes a plurality of split cores 30 configured to cooperatively define a ring shape, and a support ring (not illustrated) configured to surround outer circumferential surfaces of the plurality of split cores 30.

The split core 30 may be variously changed in number and structure in accordance with required conditions and design specifications. The present disclosure is not restricted or limited by the number of split cores 30 and the structure of the split core 30.

More specifically, the split core 30 may be configured by stacking a plurality of electrical steel sheets in an axial direction of the rotor.

A bobbin 50 (made of plastic, for example) is provided around each of the split cores, and the coil 60 is wound around the bobbin 50.

According to another embodiment of the present disclosure, the stator may include a single core.

The rotor is rotated by the electrical interaction between the stator 20 and the rotor.

As an example, the rotor may include a rotor core (not illustrated) and magnets (not illustrated). The rotor core may be structured by stacking a plurality of circular plates each provided in the form of a thin steel sheet or structured in the form of a bin.

A hole (not illustrated), to which a shaft is coupled, may be provided at a center of the rotor. Protrusions (not illustrated), which guide the magnets, may protrude from an outer circumferential surface of the rotor core. The magnets may be attached to the outer circumferential surface of the rotor core so as to be spaced apart from one another at predetermined intervals in a circumferential direction of the rotor core.

In addition, the rotor may include a can member (not illustrated) configured to surround the magnets and prevent the separation of the magnets.

Figure 2:
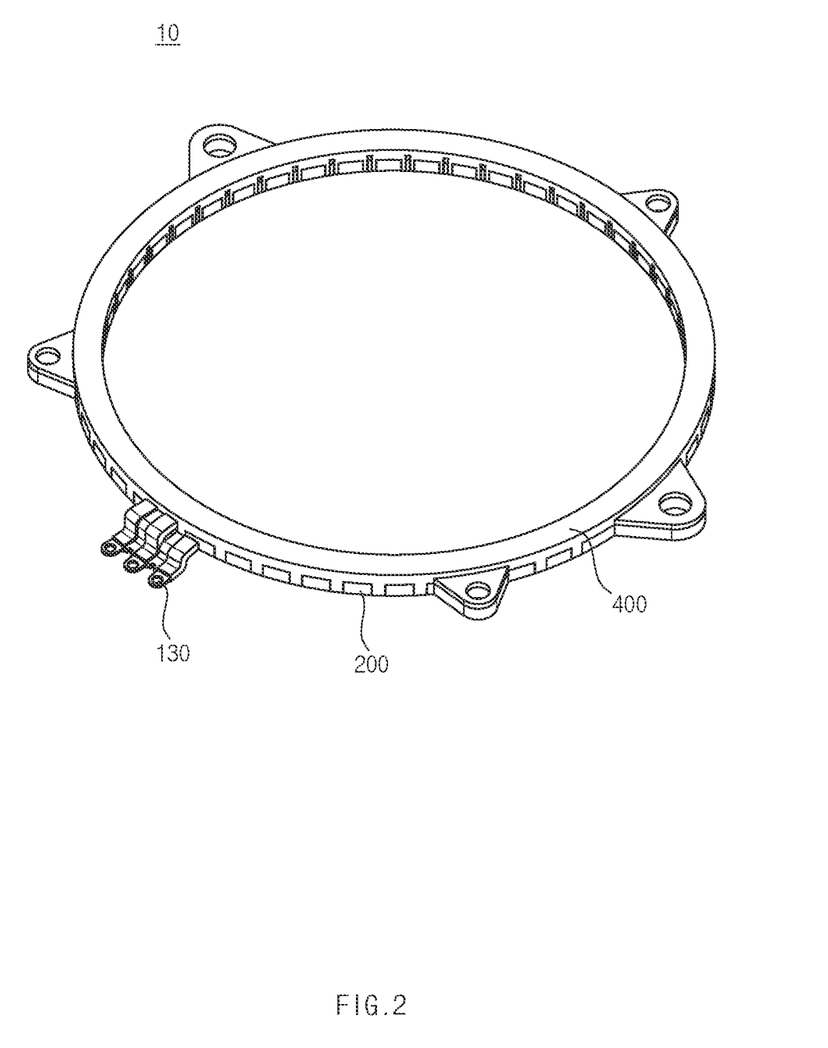
FIG. 2 is a view for explaining the busbar unit for a motor according to the embodiment of the present disclosure.

The terminals 100 of the busbar unit 10 are disposed on an upper portion (or a lower portion) of the stator 20 and electrically connect the coils 60 of the stator 20 to external power sources. The busbar unit 10 includes the first terminals 100, the first holder 200, a second terminal 300, and the second holder 400.

Figure 4:
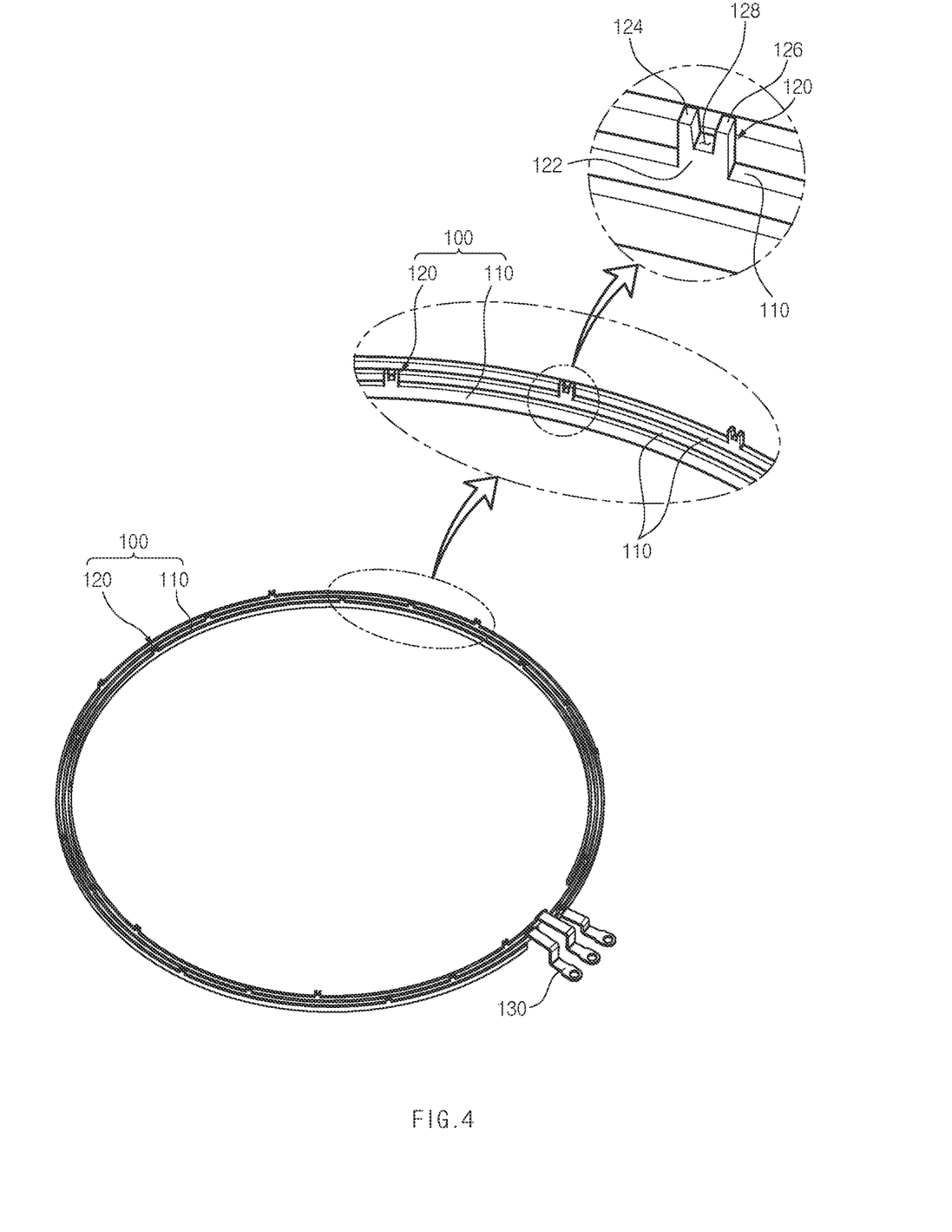
FIG. 4 is a view for explaining a first terminal of the busbar unit for a motor according to the exemplary embodiment of the present disclosure.

For example, referring to FIG. 4, the first terminal 100 may be at least any one of a U-phase terminal, a V-phase terminal, and a W-phase terminal respectively connected to a U-phase power source, a V-phase power source, and a W-phase power source.

For example, the first terminals 100 may include all the U-phase terminal, the V-phase terminal, and the W-phase terminal. The U-phase terminal, the V-phase terminal, and the W-phase terminal may be spaced apart from one another in a radial direction of the stator.

For example, the configuration in which the U-phase terminal, the V-phase terminal, and the W-phase terminal, which constitute the first terminals 100, are spaced apart from one another in the radial direction of the stator may mean that the U-phase terminal defines a first circumference, the V-phase terminal defines a second circumference larger than the first circumference, and the W-phase terminal defines a third circumference larger than the second circumference.

More specifically, the first terminal 100 may include the first body 110 accommodated in the first holder 200, and the first terminal parts 120 protruding from the upper portion of the first body 110 (an upper surface of the first body 110 based on FIG. 4) and exposed to the outside of the first holder 200.

The first body 110 may be variously changed in structure and shape in accordance with required conditions and design specifications. As an example, the first body 110 may have a single-layered structure and may be provided as a band member in the form of a ring (or an arc) having a predetermined diameter.

According to another exemplary embodiment of the present disclosure, the first body may have a double-layered structure (a multilayer structure) having a bent portion.

The first terminal part 120 extends from the upper surface of the first body 110 and protrudes from the upper portion of the first body 110. The coil 60 of the stator may be electrically connected to the first terminal part 120.

The first terminal part 120 may have various structures to which an end of the coil 60 (e.g., one end of the coil) may be electrically connected. The present disclosure is not restricted or limited by the structure and shape of the first terminal part 120.

For example, the first terminal part 120 includes a terminal body 122 protruding from the upper portion of the first body 110, a first terminal protrusion 124 protruding from an upper portion of the terminal body 122, and a second terminal protrusion 126 protruding from the upper portion of the terminal body 122 and spaced apart from the first terminal protrusion 124. The first terminal protrusion 124 and the second terminal protrusion 126 cooperatively define a terminal groove 128 that accommodates the coil 60.

Figure 3:
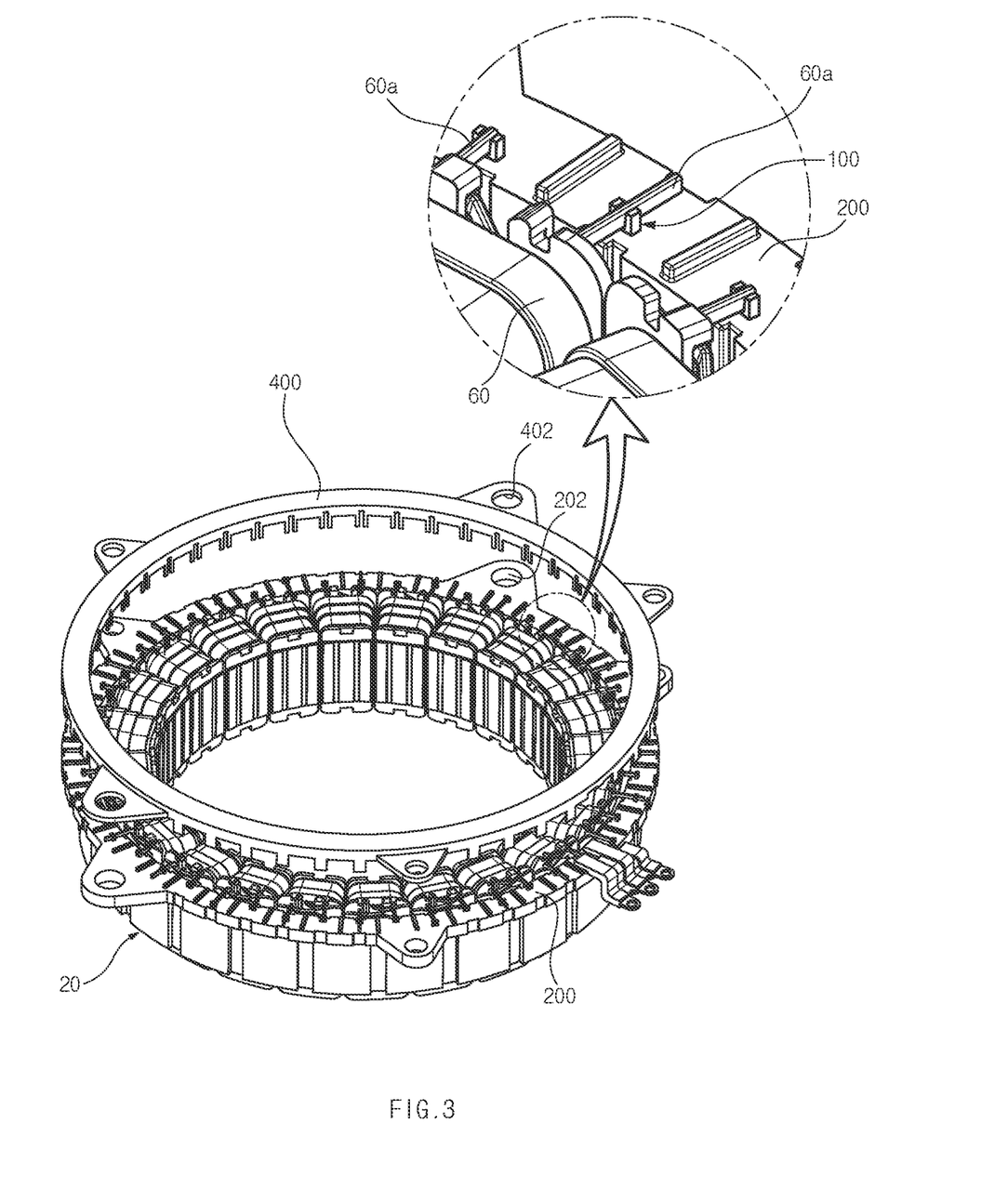
FIG. 3 is a view for explaining a coil of the busbar unit for a motor according to the embodiment of the present disclosure.

For example, the first terminal protrusion 124 and the second terminal protrusion 126 may cooperatively define an approximately "U" shape. An end 60a of the coil 60 wound around the stator 20 may be formed in the radial direction of the stator 20 and accommodated in the terminal groove 128 defined between the first terminal protrusion 124 and the second terminal protrusion 126.

Figure 10:
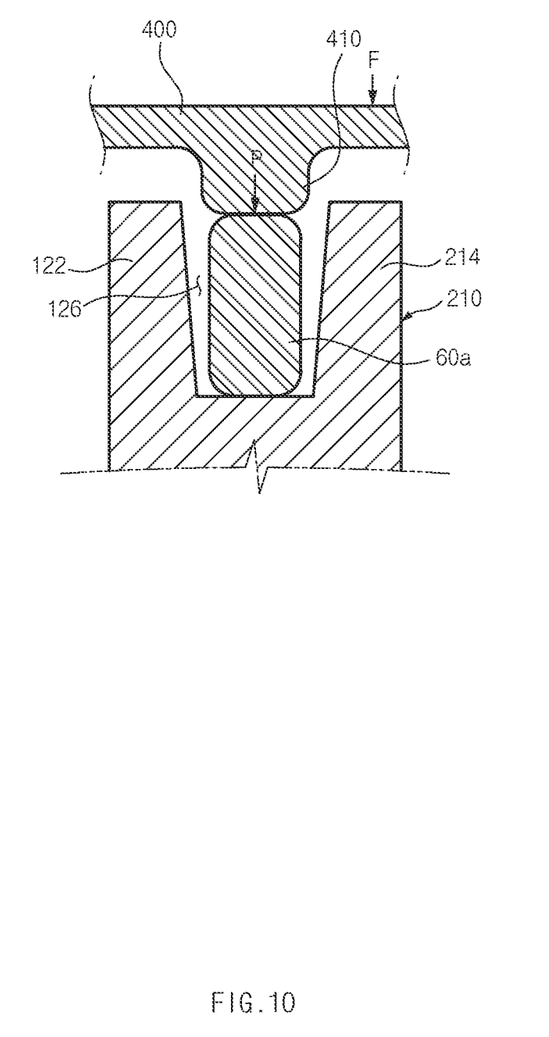
FIG. 10 is a view for explaining the coil, pressed by a fixing protrusion, in the busbar unit for a motor according to the embodiment of the present disclosure.

The end 60a of the coil 60 may be pressed (compressed) by the second holder 400 (a pressing protrusion) in a state in which the end 60a of the coil 60 is fitted into the terminal groove 128.

In addition, the first terminal 100 may include a power terminal part 130 protruding from an outer circumferential surface of the first body 110.

The power terminal part 130 extends from the outer circumferential surface of the first body 110 and protrudes from an outer circumferential surface of the first holder 200. An external power cable having a phase (e.g., the U-phase, the V-phase, or the W-phase) corresponding to the power terminal part 130 may be electrically connected to the power terminal part 130.

Figure 5:
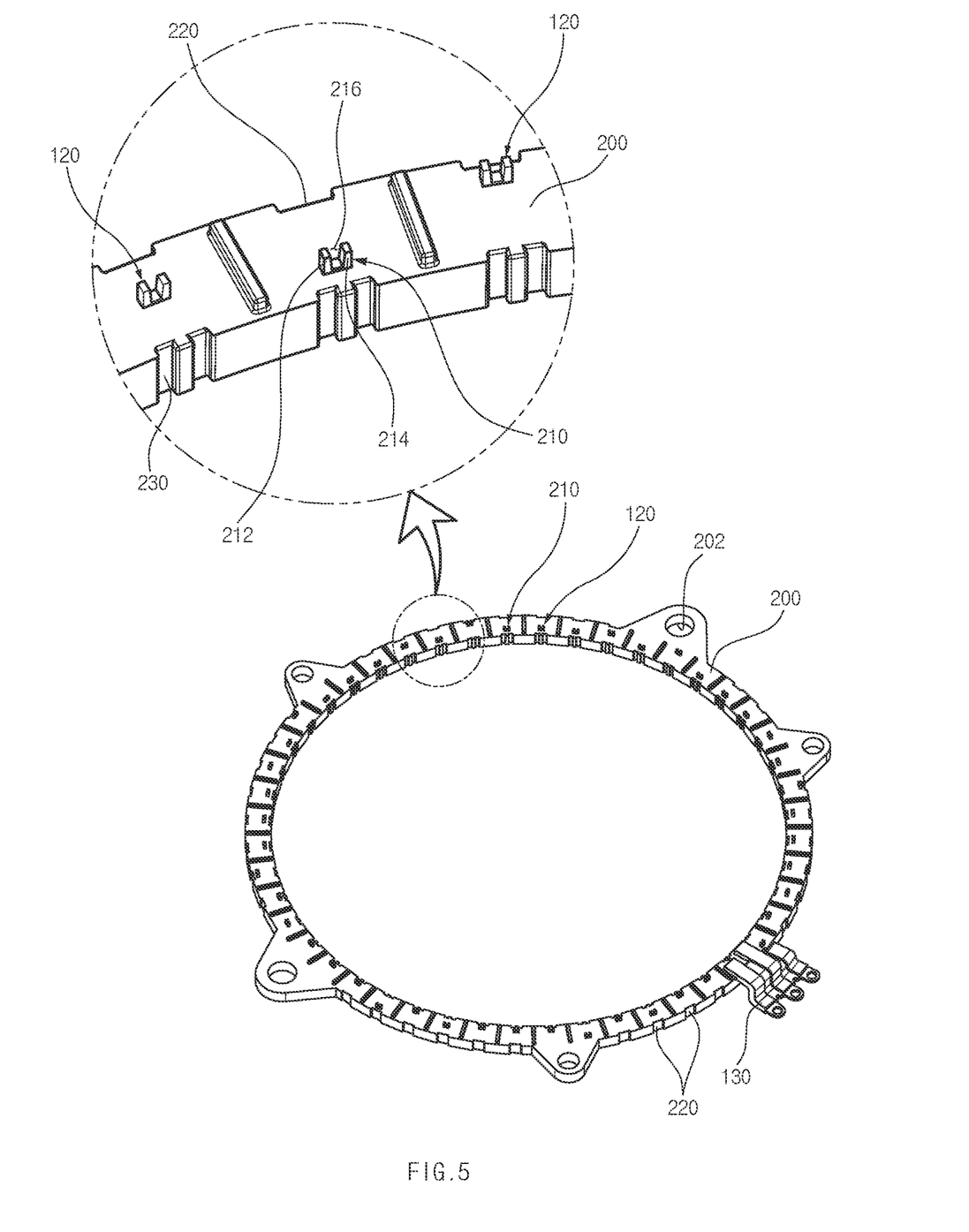
FIG. 5 is a view for explaining a first holder of the busbar unit for a motor according to the embodiment of the present disclosure.

The first holder 200 supports the arrangement state of the plurality of first terminals 100 and electrically insulates the first terminals 100.

The first holder 200 may be variously changed in material and shape in accordance with required conditions and design specifications. The present disclosure is not restricted or limited by the material and shape of the first holder 200.

For example, the first holder 200 may have a hollow ring shape and be provided as a molded product (made of an insulating material, for example) made by injection molding.

According to the exemplary embodiment of the present disclosure, the first holder 200 may be provided, by injection molding, in the form of a hollow ring that integrally surrounds the plurality of first bodies 110. The first terminal parts 120 may be exposed from the upper portion of the first holder 200.

Figure 7:
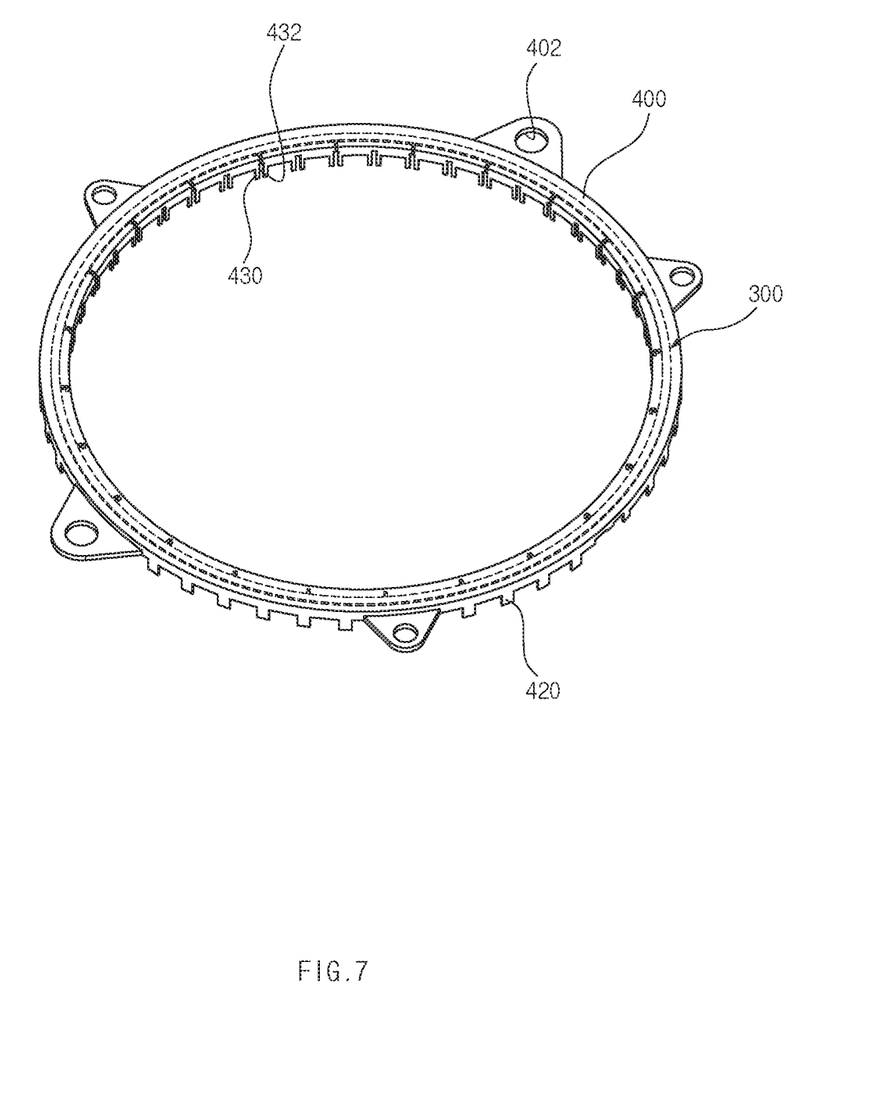
FIG. 7 is a view for explaining a second holder of the busbar unit for a motor according to the embodiment of the present disclosure.

The first holder 200 and the second holder 400 cooperatively constitute a holder for supporting the plurality of terminals. The second holder 400 serves to press the coils against the first terminal parts 120.

In this case, the configuration in which the second holder 400 presses the coil against the first terminal part 120 may mean that the second holder 400 applies a pressing force P (see FIGS. 10 and 11) to the coil in a direction in which the coil approaches the first terminal part 120 (e.g., a direction from above to below).

The second holder 400 may have various structures capable of pressing the coils against the first terminal parts 120. The present disclosure is not restricted or limited by the structure of the second holder 400.

For example, the second holder 400 may have a hollow ring shape corresponding to the first holder 200 and provided as a molded product (made of an insulating material, for example) made by injection molding.

According to the exemplary embodiment of the present disclosure, the busbar unit 10 for a motor may include pressing protrusions 410 configured to press the coils and disposed on a lower surface of the second holder 400 facing the upper surface of the first holder 200.

The pressing protrusions 410 may be disposed on the lower surface of the second holder 400 and press the coils accommodated in the terminal grooves 128 when the second holder 400 covers the upper portion of the first holder 200.

Since the pressing protrusions 410 disposed on the second holder 400 concentratedly press the coils accommodated in the terminal grooves 128 as described above, a welding process for connecting the coils and the first terminal parts 120 may be excluded, and the coils may be electrically connected (compressed) to the first terminal parts 120 without applying a compressing force and heat to the coils and the first terminal parts 120.

According to the exemplary embodiment of the present disclosure, a tip of the pressing protrusion 410, which comes into contact with the coil, may have a pointy shape to increase a fixing force made by the pressing protrusion 410 (a fixing force for fixing the coil). For example, the pressing protrusion 410 may have a cross-section with a pyramidal or conical shape or a cross-section with a serrated shape.

The pressing protrusion 410 may have various structures capable of pressing the coil accommodated in the terminal groove 128. The present disclosure is not restricted or limited by the structure and size of the pressing protrusion 410.

For example, the pressing protrusion 410 may have a rod shape having a length (length in the radial direction of the first holder 200) greater than a width thereof. Since the pressing protrusion 410 has the length greater than the width as described above, a sufficient contact area (pressing area) may be ensured between the pressing protrusion 410 and the coil. Therefore, it is possible to obtain an advantageous effect of more stably maintaining the pressed state of the coil (the electrically connected state between the coil and the first terminal part 120).

In the embodiment of the present disclosure illustrated and described above, the example has been described in which the coil is pressed by the single pressing protrusion 410 having a thin, long rod shape. However, according to another embodiment of the present disclosure, the coil may be pressed by a plurality of pressing protrusions 410 spaced apart from one another at predetermined intervals in the radial direction of the first holder.

Figure 8:
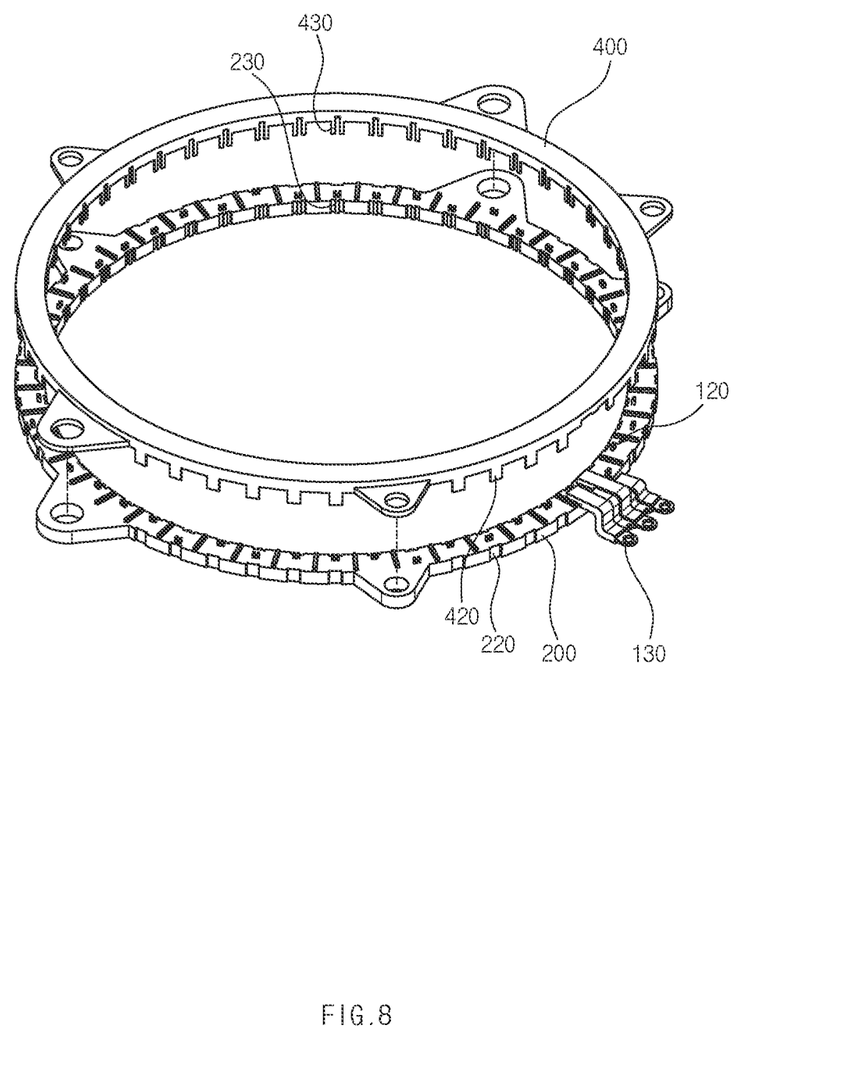
FIG. 8 is a view for explaining a structure for coupling the first holder and the second holder of the busbar unit for a motor according to the embodiment of the present disclosure.

According to the exemplary embodiment of the present disclosure, the busbar unit 10 for a motor may include fastening members 500 configured to fasten the first holder 200 and the second holder 400. The second holder 400 may press the coil against the first terminal part 120 with a fastening force F made by the fastening members 500.

In this case, the fastening force F made by the fastening member 500 may be defined as a force made by the fastening members 500 to move the first holder 200 and the second holder 400 in a direction in which the first holder 200 and the second holder 400 approach each other.

A typical fastening means such as a screw or a bolt may be used as the fastening member 500. The present disclosure is not restricted or limited by the type and structure of the fastening member 500.

For example, the busbar unit 10 for a motor may include first fastening holes 202 provided in the first holder 200, and second fastening holes 402 provided in the second holder 400. As the fastening members 500 are fastened to the first fastening holes 202 and the second fastening holes 402, the second holder 400 (the pressing protrusions) may apply a pressing force P to the coils.

Figure 6:
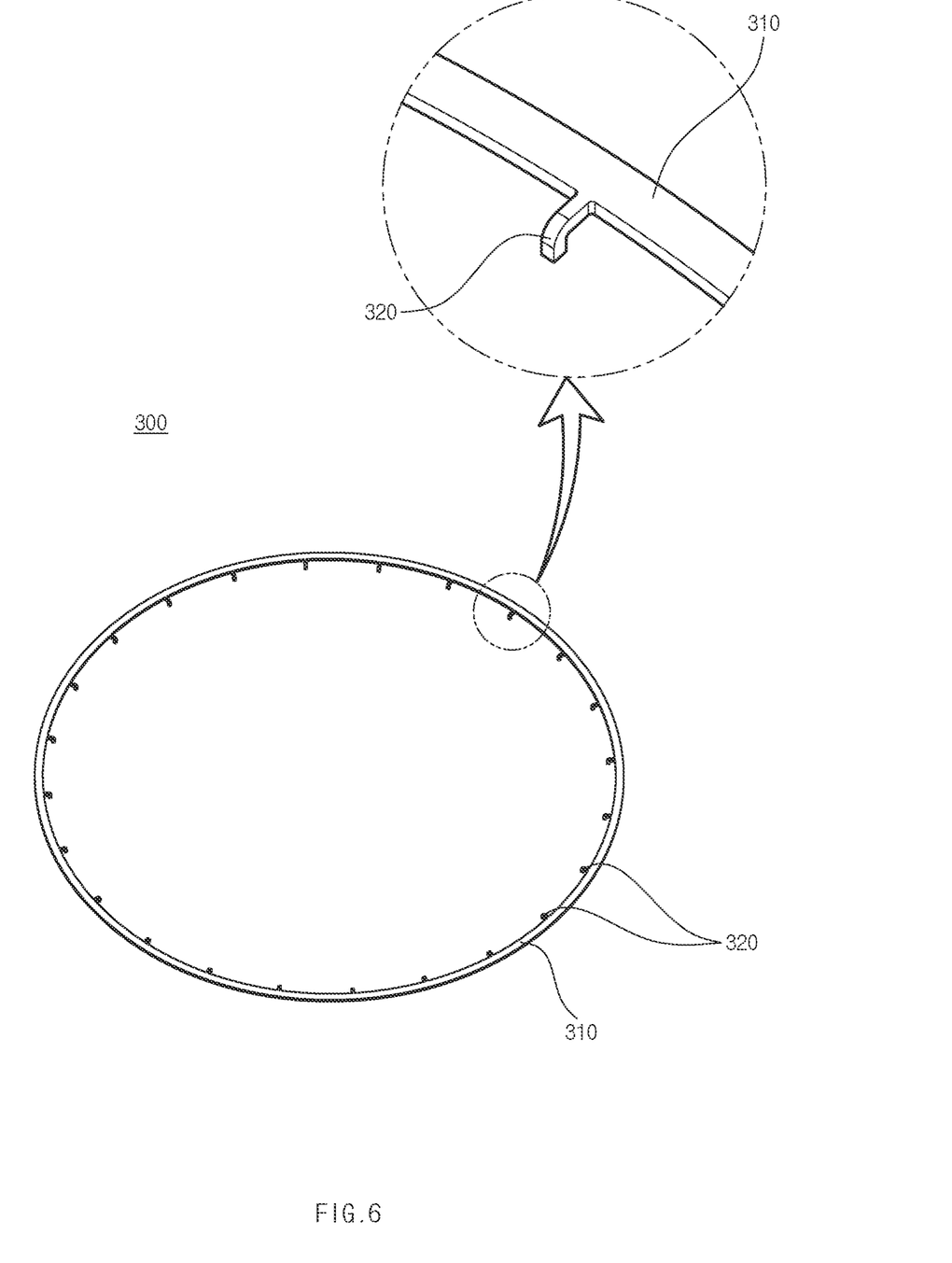
FIG. 6 is a view for explaining a second terminal of the busbar unit for a motor according to the embodiment of the present disclosure.

According to the exemplary embodiment of the present disclosure, the busbar unit 10 for a motor may include the second terminal 300 including a second body 310 disposed on the upper portion of the first holder 200, and second terminal parts 320 protruding from the lower portion of the second body 310 and electrically connected to the coils. The second holder 400 supports the second terminal 300 so that the second terminal parts 320 are exposed to the outside.

For example, referring to FIG. 6, the second terminal 300 may be a neutral terminal. According to another embodiment of the present disclosure, the second terminal may be a phase terminal (e.g., the U-phase terminal, the V-phase terminal, or the W-phase terminal).

The second body 310 may be variously changed in structure and shape in accordance with required conditions and design specifications. As an example, the second body 310 may have a single-layered structure and may be provided as a band member in the form of a ring (or an arc) having a predetermined diameter.

According to another exemplary embodiment of the present disclosure, the second body may have a double-layered layer structure (a multilayer structure) having a bent portion.

The second terminal parts 320 protrude from the lower portion of the second body 310 and are connected to an inner circumferential surface of the second body 310. The coils 60 of the stator may be electrically connected to the second terminal parts 320.

The second terminal part 320 may have various structures to which the end of the coil 60 (e.g., the other end of the coil) may be electrically connected. The present disclosure is not restricted or limited by the structure and shape of the second terminal part 320.

For example, the second terminal part 320 may be connected to the inner circumferential surface of the second body 310 and have an approximately "L" shape. An end (lower end) of the second terminal part 320 may protrude from the lower portion of the second body 310.

In particular, the second holder 400 may surround the second body 310, and the second terminal parts 320 may be exposed (protrude) from the lower portion of the second holder 400.

Figure 11:
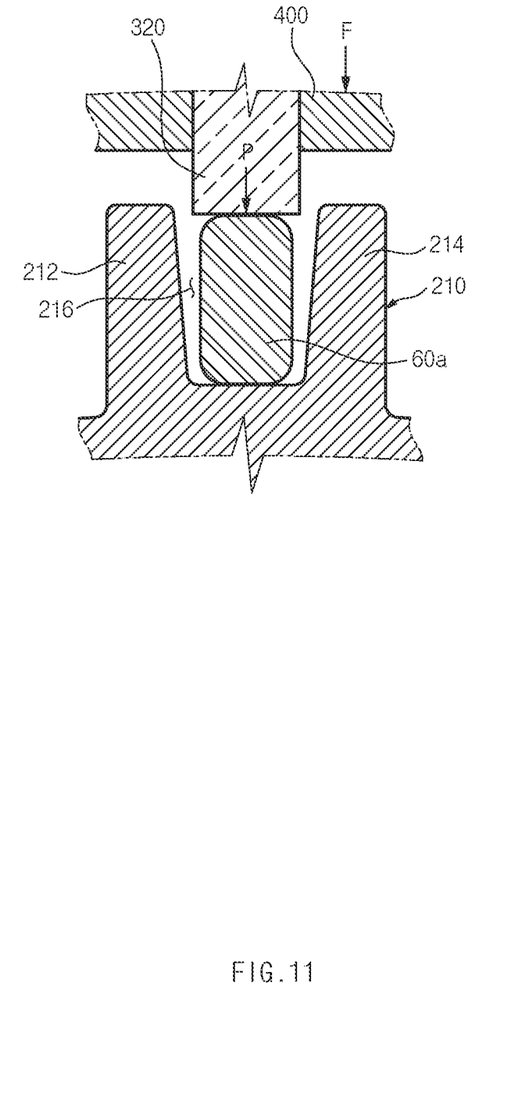
FIG. 11 is a view for explaining the coil, pressed by the second terminal, in the busbar unit for a motor according to the embodiment of the present disclosure.

According to the exemplary embodiment of the present disclosure, the second terminal parts 320 are configured to press the coils by the second holder 400.

That is, like the configuration in which the pressing protrusions 410 press the coils, the second terminal parts 320 may press the coils (e.g., the other end of the coil) disposed on the upper surface of the first holder 200 when the second holder 400 covers the upper portion of the first holder 200.

Since the second terminal parts 320 integrally connected to the second holder 400 (integrally connected to the second holder 400 by dual injection molding) press the coils disposed on the upper surface of the first holder 200 as described above, a welding process for connecting the coils and the second terminal parts 320 may be excluded, and the coils may be electrically connected (compressed) to the second terminal parts 320 without applying a compressing force and heat to the coils and the second terminal part 320.

In particular, a tip of the second terminal part 320, which comes into contact with the coil, may have a pointy shape to increase a fixing force made by the second terminal part 320 (a fixing force for fixing the coil). For example, the second terminal part 320 may have a cross-section with a pyramidal or conical shape or a cross-section with a serrated shape.

According to the exemplary embodiment of the present disclosure, coil accommodation parts 210 may be disposed on the upper surface of the first holder 200 facing the lower surface of the second holder 400. The second terminal parts 320 may press the coils accommodated in the coil accommodation parts 210.

Since the coils are accommodated in the coil accommodation parts 210 disposed on the upper surface of the first holder 200 as described above, the arrangement state of the coils disposed on the upper surface of the first holder 200 may be stably maintained (fixed) when the second terminal parts 320 press the coils. Therefore, it is possible to obtain an advantageous effect of pressing the coils with a sufficient pressing force and stably maintaining the electrically connected state between the coils and the second terminal parts 320.

The coil accommodation part 210 may have various structures capable of accommodating the end of the coil. The present disclosure is not restricted or limited by the structure of the coil accommodation part 210.

For example, the coil accommodation part 210 includes a first accommodation protrusion 212 protruding from the upper portion of the first holder 200, and a second accommodation protrusion 214 protruding from the upper portion of the first holder 200 and spaced apart from the first accommodation protrusion 212. The first accommodation protrusion 212 and the second accommodation protrusion 214 cooperatively define an accommodation groove 216 that accommodates the coil.

For example, the first accommodation protrusion 212 and the second accommodation protrusion 214 may cooperatively define an approximately "U" shape. The end (the other end) 60a of the coil 60 wound around the stator 20 may be formed in the radial direction of the stator 20 and accommodated in the accommodation groove 216 defined between the first accommodation protrusion 212 and the second accommodation protrusion 214.

The pressing force P made by the second terminal part 320 may be applied to the coil 60 in a state in which the end 60a of the coil 60 is fitted into the accommodation groove 216.

According to the exemplary embodiment of the present disclosure, the busbar unit 10 for a motor may include an air layer (not illustrated) defined between the first holder 200 and the second holder 400.

The air layer serves to ensure the electrical insulation between the first terminal 100 and the second terminal 300 and minimize an insulation defect.

The air layer may be variously changed in size (e.g., thickness) and structure in accordance with required conditions and design specifications. The present disclosure is not restricted or limited by the size and structure of the air layer.

According to another embodiment of the present disclosure, a spacer made of an insulating material may be interposed between the first holder and the second holder.

As described above, according to the embodiment of the present disclosure, the holder for supporting the terminals (the first terminal and the second terminal) may be configured only by the first holder 200 and the second holder 400. Therefore, it is possible to obtain an advantageous effect of simplifying the structure and manufacturing process of the holder and reducing the manufacturing time thereof.

That is, in the related art, an overmolded layer for electrical insulation needs to be individually formed on each of the four terminals (the overmolded layer needs to be formed to surround each of the terminals), and an overmolded housing needs to be additionally provided to surround the entire circumference of the plurality of overmolded layers stacked in the vertical direction. As a result, there is a problem in that the manufacturing process is complicated and cumbersome. Moreover, in the related art, since an overall height of the busbar is increased as a thickness of the overmolded layer is increased, there is a problem in that it is difficult to ensure a sufficient thickness of the overmolded layer.

However, according to the embodiment of the present disclosure, the holder for supporting the terminals may be provided only by the two injection-molding processes (the process of injection-molding the first holder 200 and the process of injection-molding the second holder 400). Therefore, it is possible to obtain an advantageous effect of ensuring the electrical insulation performance, simplifying the structure of the holder, and simplifying the process of manufacturing the holder.

Figure 9:
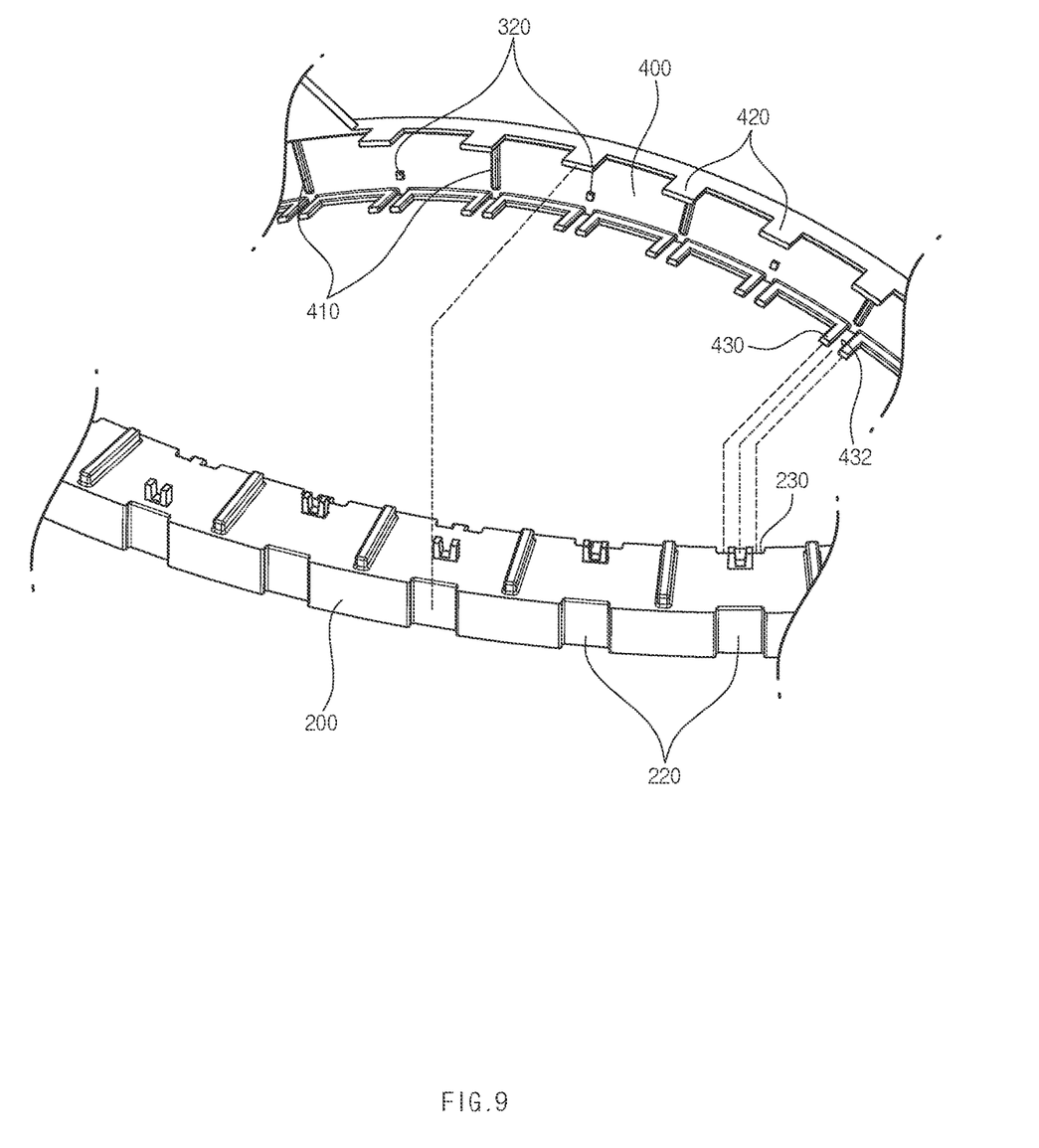
FIG. 9 is a view for explaining first and second guide protrusions and first and second guide grooves of the busbar unit for a motor according to the embodiment of the present disclosure.

According to the exemplary embodiment of the present disclosure, the busbar unit 10 for a motor may include first guide grooves 220 provided in the outer circumferential surface of the first holder 200, and first guide protrusions 420 protruding from the lower portion of the second holder 400 and accommodated in the first guide grooves 220.

Since the first guide grooves 220 are provided in the first holder 200 and the first guide protrusions 420 are provided on the second holder 400 as described above, it is possible to obtain an advantageous effect of guiding the second holder 400 so that the second holder 400 is disposed at an exact position on the upper portion of the first holder 200 at which the pressing protrusions 410 and the second terminal parts 320 may press the coils with a sufficient pressing force. Further, it is possible to obtain an advantageous effect of inhibiting the second holder 400 from moving (rotating) relative to the first holder 200.

The first guide protrusion 420 may have various structures capable of being accommodated in the first guide groove 220. The present disclosure is not restricted or limited by the shapes and structures of the first guide protrusion 420 and the first guide groove 220.

For example, the first guide protrusion 420 may have a cross-section (e.g., a quadrangular cross-section) corresponding to a cross-section of the first guide groove 220. The first guide protrusion 420 and the first guide groove 220 may be provided in plural and the plurality of first guide protrusions 420 and the plurality of first guide grooves 220 may be spaced apart from one another in a circumferential direction of the second holder 400.

According to another embodiment of the present disclosure, the first holder may have the first guide protrusions, and the second holder may have the first guide grooves.

According to the exemplary embodiment of the present disclosure, the busbar unit 10 for a motor may include second guide grooves 230 provided in the inner circumferential surface of the first holder 200, and second guide protrusions 430 protruding from the lower portion of the second holder 400 and accommodated in the second guide grooves 230.

Since the second guide grooves 230 are provided in the first holder 200 and the second guide protrusions 430 are provided on the second holder 400 as described above, it is possible to obtain an advantageous effect of more stably maintaining the arrangement state of the second holder 400 with respect to the first holder 200 and minimizing erroneous assembly of the second holder 400.

The second guide protrusion 430 may have various structures capable of being accommodated in the second guide groove 230. The present disclosure is not restricted or limited by the shapes and structures of the second guide protrusion 430 and the second guide groove 230.

For example, the second guide protrusion 430 may have a cross-section (e.g., a quadrangular cross-section) corresponding to a cross-section of the second guide groove 230. The second guide protrusion 430 and the second guide groove 230 may be provided in plural and the plurality of second guide protrusions 430 and the plurality of second guide grooves 230 may be spaced apart from one another in the circumferential direction of the second holder 400.

According to another embodiment of the present disclosure, the first holder may have the second guide protrusions, and the second holder may have the second guide grooves.

In particular, the second guide protrusion 430 may have a coil guide groove 432 that accommodates the coil.

For example, the coil guide groove 432 may be disposed at an approximately central portion of the second guide protrusion 430 and provided in the upward/downward direction.

When the second holder 400 is disposed on the upper portion of the first holder 200, the second guide protrusions 430 may be accommodated in the second guide grooves 230, and the coils may be inserted into openings of the coil guide grooves 432 and accommodated in the coil guide grooves 432.

Since the coils are accommodated in the coil guide grooves 432 as described above, it is possible to obtain an advantageous effect of effectively inhibiting the movement and rotation of the second holder 400 relative to the first holder 200 and more stably maintaining the arrangement state of the coils (the state in which the coils are formed in the radial direction of the stator).

According to the embodiment of the present disclosure described above, it is possible to obtain an advantageous effect of simplifying the structure and improving the stability and reliability.

In particular, according to the embodiment of the present disclosure, it is possible to obtain an advantageous effect of simplifying the process of electrically connecting the coil and the busbar unit and minimizing the damage to the coil and the deterioration in durability.

In addition, according to the embodiment of the present disclosure, it is possible to obtain an advantageous effect of simplifying the manufacturing process, improving the work efficiency, and reducing the manufacturing time.

In addition, according to the embodiment of the present disclosure, it is possible to obtain an advantageous effect of minimizing the thickness of the busbar unit and reducing the size of the motor in which the busbar unit is mounted.

In addition, according to the embodiment of the present disclosure, it is possible to obtain an advantageous effect of improving the electrical insulation performance and improving the stability and reliability.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A busbar unit electrically connected to a motor comprising a stator around which a coil is wound, the busbar unit comprising:
    a first terminal comprising:
        a first body; and
        a first terminal part protruding from an upper portion of the first body and electrically connected to the coil;
    a first holder configured to support the first terminal such that the first terminal part is exposed to an outside of the busbar unit;
    a second holder disposed on an upper portion of the first holder and configured to press the coil against the first terminal part; and a fastening member configured to fasten the first holder and the second holder.

2. The busbar unit of claim 1, further comprising:
a pressing protrusion configured to press the coil, and disposed on a lower surface of the second holder facing an upper surface of the first holder.

3. The busbar unit of claim 1, wherein the first terminal part further comprises:
a terminal body protruding from the upper portion of the first body;
a first terminal protrusion protruding from an upper portion of the terminal body; and
a second terminal protrusion protruding from the upper portion of the terminal body and spaced apart from the first terminal protrusion, and
wherein the first terminal protrusion and the second terminal protrusion cooperatively define a terminal groove configured to accommodate the coil.

4. The busbar unit of claim 1, wherein the first holder surrounds the first body, and the first terminal part is exposed from the upper portion of the first holder.

5. The busbar unit of claim 1, wherein the first terminal includes a plurality of first terminals spaced apart from one another in a radial direction of the stator.

6. The busbar unit of claim 1, further comprising:
a second terminal comprising:
a second body disposed on the upper portion of the first holder; and
a second terminal part protruding from a lower portion of the second body and electrically connected to the coil,
wherein the second holder supports the second terminal such that the second terminal part is exposed to the outside of the busbar unit.

7. The busbar unit of claim 6, wherein the second terminal part is configured to press the coil with a force applied by the second holder.

8. The busbar unit of claim 7, further comprising:
a coil accommodation part configured to accommodate the coil, and disposed on an upper surface of the first holder facing a lower surface of the second holder.

9. The busbar unit of claim 8, wherein the coil accommodation part comprises:
a first accommodation protrusion protruding from the upper portion of the first holder; and
a second accommodation protrusion protruding from the upper portion of the first holder and spaced apart from the first accommodation protrusion, and
wherein the first accommodation protrusion and the second accommodation protrusion cooperatively define an accommodation groove configured to accommodate the coil.

10. The busbar unit of claim 6, wherein the second holder surrounds the second body, and the second terminal part is exposed from a lower portion of the second holder.

11. The busbar unit of claim 1,
wherein the second holder is configured to press the coil with a fastening force applied by the fastening member.

12. The busbar unit of claim 11, comprising:
a first fastening hole disposed in the first holder; and
a second fastening hole disposed in the second holder,
wherein the fastening member is fastened to the first fastening hole and the second fastening hole.

13. The busbar unit of claim 1, further comprising:
a guide groove disposed in an outer circumferential surface of the first holder; and
a guide protrusion protruding from a lower portion of the second holder and accommodated in the guide groove.

14. The busbar unit of claim 1, further comprising:
a guide groove disposed in an inner circumferential surface of the first holder; and
a guide protrusion protruding from a lower portion of the second holder and accommodated in the guide groove.

15. The busbar unit of claim 14, wherein the guide protrusion includes a coil guide groove configured to accommodate the coil.

16. A busbar unit electrically connected to a motor comprising a stator around which a coil is wound, the busbar unit comprising:
a first terminal comprising:
a first body; and
a first terminal part protruding from an upper portion of the first body and electrically connected to the coil;
a first holder configured to support the first terminal such that the first terminal part is exposed to an outside of the busbar unit;
a second holder disposed on an upper portion of the first holder and configured to press the coil against the first terminal part; and
a pressing protrusion configured to press the coil, and disposed on a lower surface of the second holder facing an upper surface of the first holder.

17. A busbar unit electrically connected to a motor comprising a stator around which a coil is wound, the busbar unit comprising:
a first terminal comprising:
a first body; and
a first terminal part protruding from an upper portion of the first body and electrically connected to the coil;
a first holder configured to support the first terminal such that the first terminal part is exposed to an outside of the busbar unit; and
a second holder disposed on an upper portion of the first holder and configured to press the coil against the first terminal part,
wherein the first terminal includes a plurality of first terminals spaced apart from one another in a radial direction of the stator.

* * * * *